(12) United States Patent
Klemen

(10) Patent No.: US 7,285,069 B2
(45) Date of Patent: Oct. 23, 2007

(54) MULTI-SPEED POWER TRANSMISSION

(75) Inventor: Donald Klemen, Carmel, IN (US)

(73) Assignee: General Motors Corporation, Detroit, MI (US)

( * ) Notice: Subject to any disclaimer, the term of this patent is extended or adjusted under 35 U.S.C. 154(b) by 204 days.

(21) Appl. No.: 11/238,394

(22) Filed: Sep. 29, 2005

(65) Prior Publication Data

US 2007/0072731 A1   Mar. 29, 2007

(51) Int. Cl.
*F16H 3/62* (2006.01)
(52) U.S. Cl. .................. 475/275; 475/277; 475/286; 475/288
(58) Field of Classification Search .............. None
See application file for complete search history.

(56) References Cited

U.S. PATENT DOCUMENTS

| | | | | |
|---|---|---|---|---|
| 4,038,888 A | * | 8/1977 | Murakami et al. | 475/276 |
| 4,046,031 A | * | 9/1977 | Ott et al. | 475/280 |
| 4,395,925 A | * | 8/1983 | Gaus | 475/278 |
| 4,531,428 A | * | 7/1985 | Windish | 475/279 |
| 4,683,776 A | * | 8/1987 | Klemen | 475/286 |
| 6,176,803 B1 | * | 1/2001 | Meyer et al. | 475/286 |
| 6,976,930 B2 | * | 12/2005 | Winzeler | 475/277 |
| 7,128,683 B2 | * | 10/2006 | Oguri et al. | 475/276 |
| 7,163,484 B2 | * | 1/2007 | Klemen | 475/276 |
| 7,204,780 B2 | * | 4/2007 | Klemen | 475/279 |
| 2004/0048716 A1 | * | 3/2004 | Ziemer | 475/286 |
| 2007/0072732 A1 | * | 3/2007 | Klemen | 475/280 |

* cited by examiner

*Primary Examiner*—Sherry Estremsky

(57) ABSTRACT

A powertrain incorporates a multi-speed planetary transmission having four planetary gearsets and seven torque-transmitting mechanisms. The planetary gearsets are interconnected and controlled by the torque-transmitting mechanisms in combinations of two, such that eight forward speeds and three reverse speeds are developed between an input shaft and an output shaft of the transmission.

5 Claims, 2 Drawing Sheets

| SEVEN CLUTCH 8 SPEED OR SIX CLUTCH 7 SPEED DEEP RATIO | | | | | |
|---|---|---|---|---|---|
| Rev 2 | −1.650 | 1.59 | C2 | 32 | 40 |
| Rev 1 | −2.625 | 1.69 | L | 34 | 40 |
| REV LOW | −4.446 | – | LL | 36 | 40 |
| Gear | Ratio | Step | Clutches | | |
| 1 LOW | 5.426 | – | LL | 36 | 42 |
| 2 FRIST | 3.204 | 1.69 | L | 34 | 42 |
| 3 SECOND | 2.014 | 1.59 | C2 | 32 | 42 |
| 4 THIRD | 1.383 | 1.46 | C3 | 30 | 42 |
| 5 FOURTH | 1.000 | 1.38 | C3 | 30 | 32 |
| 6 FIFTH | 0.816 | 1.22 | C3 | 30 | L |
| 7 SIXTH | 0.7241 | 1.13 | C3 | 30 | LL |
| 8 SEVENTH | 0.623 | 1.16 | C3 | 30 | C4 |

$$\frac{R\,46}{S\,44}=1.69 \quad \frac{R\,56}{S\,54}=1.69 \quad \frac{R\,66}{S\,64}=2.61 \quad \frac{R\,76}{S\,74}=2.19$$

MULTI-SPEED POWER TRANSMISSION

TECHNICAL FIELD

This invention relates to powertrains having multi-speed power transmissions and, more particularly, to power transmissions having four planetary gearsets providing eight forward speeds with seven torque-transmitting mechanisms.

BACKGROUND OF THE INVENTION

Passenger vehicles employ or incorporate a multi-speed power transmission of either the manual type, that is, countershaft, or the automatic type, that is, planetary. With the advent of the desire to improve performance and economy, the number of speeds available with these transmissions has increased from two in automatic transmissions, to five or more. In manual transmissions, the number of speeds has increased from three to six or more.

Also, with the desire for improved economy, manufacturers are considering lower-displacement high-speed engines, which will provide better fuel economy, maintain the performance, and reduce the engine size. The engines being considered are apt to reach speeds of 7000 to 8000 rpm at their maximum usable level. It will therefore be incumbent to provide transmissions, which will satisfy the powertrain needs for these higher speed engines.

SUMMARY OF THE INVENTION

It is an object of the present invention to provide an improved power transmission having eight forward speeds.

In one aspect of the present invention, the power transmission incorporates four planetary gearsets that are interconnected.

In another aspect of the present invention, the power transmission includes seven torque-transmitting mechanisms for controlling the planetary gearsets to establish the eight forward speeds between an input shaft and an output shaft.

In still another aspect of the present invention, three of the torque-transmitting mechanisms are rotating-type torque-transmitting mechanisms, and four of the torque-transmitting mechanisms are stationary-type torque-transmitting mechanisms.

In yet another aspect of the present invention, two of the planetary gearsets have a member continuously driven by the input shaft and are operable as input gearsets to provide reduced speeds to the remaining two planetary gearsets.

In still yet another aspect of the present invention, each of the two input gearsets include stationary torque-transmitting controlling mechanisms to establish the reduction speeds, which are distributed.

DESCRIPTION OF THE EXEMPLARY EMBODIMENTS

Figures 1, 2:
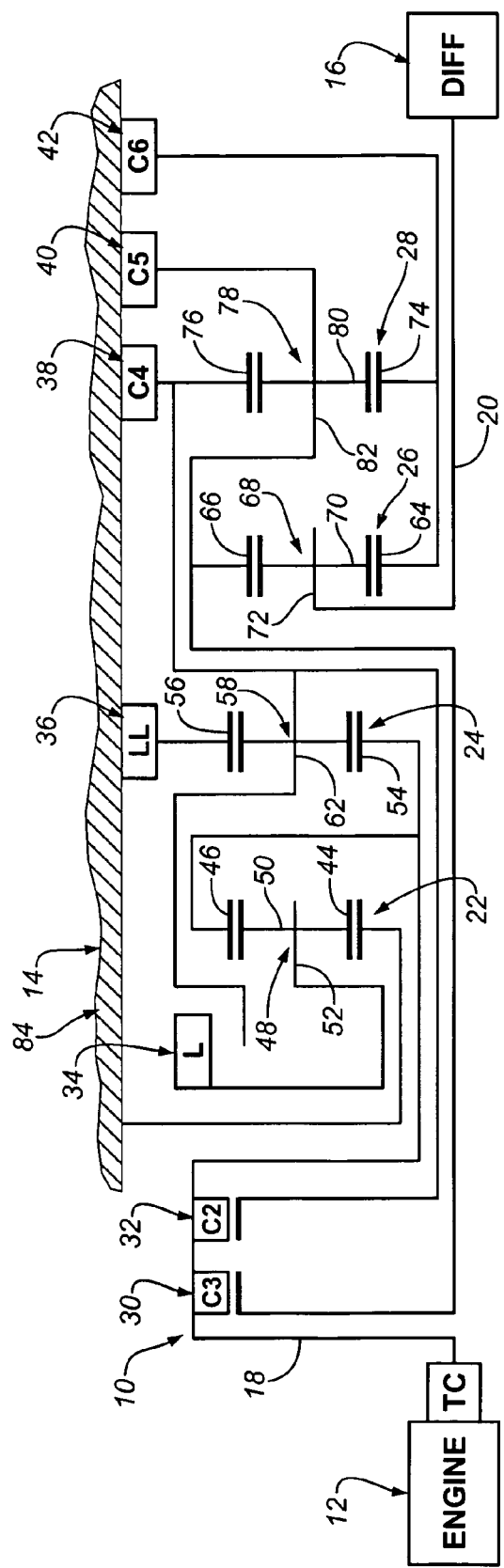
FIG. 1 is a powertrain having a power transmission describing one embodiment of the present invention.
FIG. 2 is a chart depicting the speed ratios and torque transmitting engagement sequence for the transmission shown in FIG. 1.

Referring to the drawings, wherein like characters represent the same or corresponding parts throughout the several views, there is shown in FIG. 1 a powertrain 10 having an engine 12, a power transmission 14, and a conventional differential output 16. The engine 12 may include a torque converter (TC), if desired. The engine 12 and torque converter (TC) are drivingly connected with an input shaft 18, and the differential 16 is drivingly connected with an output shaft 20.

The power transmission includes four planetary gearsets 22, 24, 26, and 28 and seven torque-transmitting mechanisms 30, 32, 34, 36, 38, 40, and 42. The torque-transmitting mechanisms 30, 32, and 34 are rotating-type torque-transmitting mechanisms, commonly termed clutches, and the torque-transmitting mechanisms 36, 38, 40, and 42 are stationary-type torque-transmitting mechanisms, commonly termed brakes or reaction clutches.

The planetary gearset 22 includes a sun gear member 44, a ring gear member 46, a planet carrier assembly member 48, which includes a plurality of pinion gears 50 rotatably mounted on a planet carrier member 52 and disposed in meshing relationship with the sun gear member 44 and the ring gear member 46.

The planetary gearset 24 includes a sun gear member 54, a ring gear member 56, a planet carrier assembly member 58, which includes a plurality of pinion gears 60 rotatably mounted on a planet carrier member 62 and disposed in meshing relationship with the sun gear member 54 and ring gear member 56.

The planetary gearset 26 includes a sun gear member 64, a ring gear member 66, a planet carrier assembly member 68, which includes a plurality of pinion gears 70 rotatably disposed on a planet carrier member 72 and meshing with the sun gear member 64 and ring gear member 66.

The planetary gearset 28 includes a sun gear member 74, a ring gear member 76, a planet carrier assembly member 78, which includes a plurality of pinion gears 80 rotatably disposed on a planet carrier member 82 and meshing with the sun gear member 74 and ring gear member 76.

The sun gear member 44 is continuously connected to a stationary transmission housing 84. The planet carrier member 52 is connectible with the planet carrier member 62 through the torque-transmitting mechanism 34. The ring gear member 46 is continuously connected with the input shaft 18 and the sun gear member 54 and is selectively connectible with the planet carrier member 62 and the ring gear member 76 through the torque-transmitting mechanism 32, which also connects the input shaft 18 to the members 62 and 76.

The sun gear member 64 and sun gear member 74 are continuously interconnected and are selectively connectible with the transmission housing 84 through the torque-transmitting mechanism 42. The planet carrier member 72 is continuously connected with the output shaft 20. The ring gear member 66 is continuously connected with the planet carrier member 82 and selectively connectible with the transmission housing 84 through the torque-transmitting mechanism 40, and selectively connectible with the input shaft 18 through the torque-transmitting mechanism 30.

As seen in the chart of FIG. 2, the torque-transmitting mechanisms are engaged in combinations of two to establish three reverse ratios and eight forward ratios. Also in the chart of FIG. 2, an example of numerical ratios is given. The step between adjacent ratios is also given in the chart of FIG.

2. These ratio numbers are determined using the ring/sun ratios, which are also given in FIG. 2. Those skilled in the art will readily recognize that by changing the ring/sun ratios, the numerical value of the speed ratios are changed accordingly.

To establish the highest numerical value of reverse ratio, the torque-transmitting mechanisms 36 and 40 are engaged. To establish the next numerical value of reverse, the torque-transmitting mechanisms 34 and 40 are engaged. To establish the lowest numerical value of reverse, the torque-transmitting mechanisms 32 and 40 are engaged.

To establish the low forward speed ratio, the torque-transmitting mechanisms 36 and 42 are engaged. To establish the first forward speed ratio, the torque-transmitting mechanisms 34 and 42 are engaged. To establish the second forward speed ratio, the torque-transmitting mechanisms 32 and 42 are engaged. To establish the third forward speed ratio, the torque-transmitting mechanisms 30 and 42 are engaged. To establish the fourth forward speed ratio, the torque-transmitting mechanisms 30 and 32 are engaged. To establish the fifth forward speed ratio, the torque-transmitting mechanisms 30 and 34 are engaged. To establish the sixth forward speed ratio, the torque-transmitting mechanisms 30 and 36 are engaged. And, to establish the seventh forward speed ratio, the torque-transmitting mechanisms 30 and 38 are engaged.

As one can readily discern from the chart, the transmission provides four underdrive forward ratios, a direct drive forward ratio, and three overdrive forward ratios. It should also be noted that each of the interchanges between the forward speed ratios are single transition shifts, that is, only a single torque-transmitting mechanism is disengaged while another torque-transmitting mechanism is engaged. Also, the interchanges between adjacent reverse speed ratios are single transition as well as the transition between the lowest reverse ratio and the low forward speed ratio.

The speed ratios will, of course, be modified by the final drive ratio, which is part of the differential 16. The lowest reverse ratio −4.446 and the low forward ratio 5.426 permit vehicle launch during heavy towing, which is important in truck transmissions. It should be noted that the ratio interchanges in the first forward speed and the intermediate reverse speed are with a single transition interchange and the interchange between the highest reverse (−1.65) and the second forward speed (2.014) is also a single transition interchange. Thus, the vehicle can be operated in combinations, which will permit the shifting between these ratios depending upon the load requirements of the vehicle. By providing the three overdrive ratios, the highest of which is 0.623, the transmission will accommodate low-speed engines.

Figure 3:
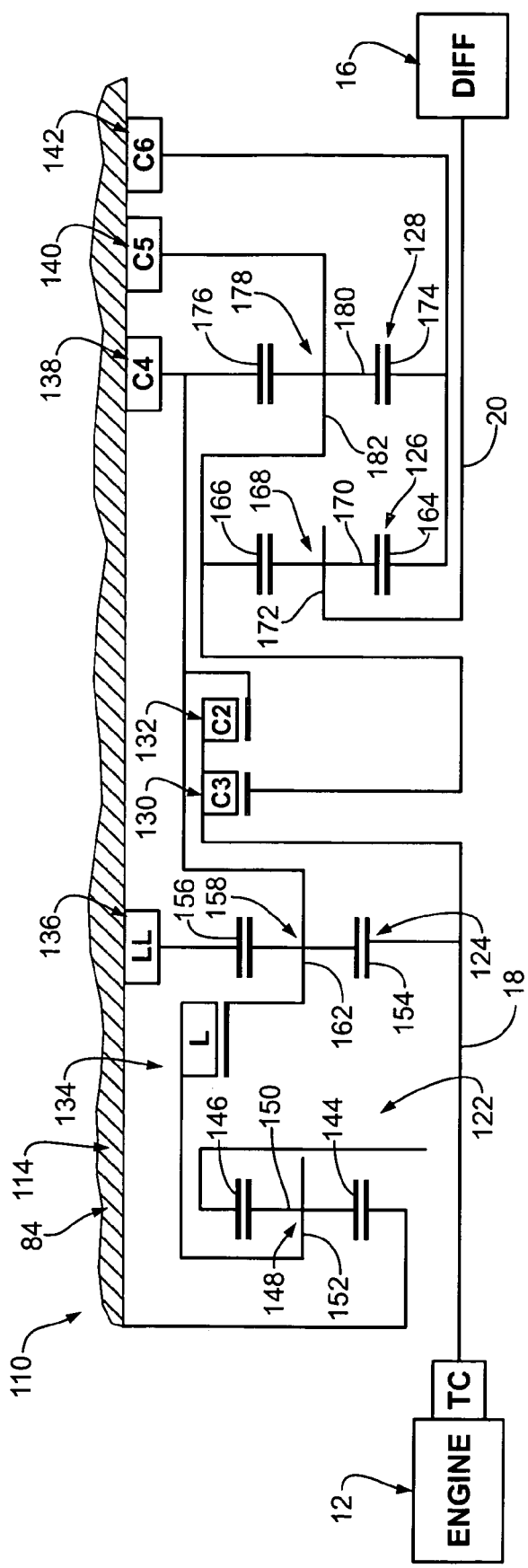
FIG. 3 is a powertrain having a power transmission describing another embodiment of the present invention, which also has a torque-transmitting engagement schedule shown in FIG. 2.

FIG. 3 describes a powertrain 110 having an engine 12, an output shaft 20, a power transmission 114, and a conventional differential mechanism 16. The engine 12 may include a torque converter (TC), if desired. The engine 12 and torque converter (TC) are drivingly connected with an input shaft 18 and the differential 16 is drivingly connected with an output shaft 20.

The power transmission includes four planetary gearsets 122, 124, 126, and 128 and seven torque-transmitting mechanisms 130, 132, 134, 136, 138, 140, and 142. The torque-transmitting mechanisms 130, 132, and 134 are rotating-type torque-transmitting mechanisms, commonly termed clutches, and the torque-transmitting mechanisms 136, 138, 140, and 142 are stationary-type torque-transmitting mechanisms, commonly termed brakes or reaction clutches.

The planetary gearset 122 includes a sun gear member 144, a ring gear member 146, a planet carrier assembly member 148, which includes a plurality of pinion gears 150 rotatably mounted on a planet carrier member 152 and disposed in meshing relationship with the sun gear member 144 and the ring gear member 146.

The planetary gearset 124 includes a sun gear member 154, a ring gear member 156, a planet carrier assembly member 158, which includes a plurality of pinion gears 160 rotatably mounted on a planet carrier member 162 and disposed in meshing relationship with the sun gear member 154 and ring gear member 156.

The planetary gearset 126 includes a sun gear member 164, a ring gear member 166, a planet carrier assembly member 168, which includes a plurality of pinion gears 170 rotatably disposed on a planet carrier member 172 and meshing with the sun gear member 164 and ring gear member 166.

The planetary gearset 128 includes a sun gear member 174, a ring gear member 176, a planet carrier assembly member 178, which includes a plurality of pinion gears 180 rotatably disposed on a planet carrier member 182 and meshing with the sun gear member 174 and ring gear member 176.

The sun gear member 144 is continuously connected to a stationary transmission housing 84. The planet carrier member 152 is connectible with the planet carrier member 162 through the torque-transmitting mechanism 134. The ring gear member 146 is continuously connected with the input shaft 18 and the sun gear member 154 and is selectively connectible with the planet carrier member 162 and the ring gear member 176 through the torque-transmitting mechanism 132, which also connects the input shaft 18 to the members 162 and 176.

The sun gear member 164 and sun gear member 174 are continuously interconnected and are selectively connectible with the transmission housing 84 through the torque-transmitting mechanism 142. The planet carrier member 172 is continuously connected with the output shaft 20. The ring gear member 166 is continuously connected with the planet carrier member 182 and selectively connectible with the transmission housing 84 through the torque-transmitting mechanism 140, and selectively connectible with the input shaft 18 through the torque-transmitting mechanism 130.

The invention claimed is:

1. A powertrain having a multi-speed transmission comprising:
   an input shaft;
   an output shaft;
   a transmission housing;
   a first planetary gearset having first, second and third members;
   a second planetary gearset having first, second and third members;
   a third planetary gearset having first, second and third members;
   a fourth planetary gearset having first, second and third members;
   seven torque-transmitting mechanisms;
   said first member of said first planetary gearset being continuously connected with said transmission housing;
   said second member of said first planetary gearset being connected with a first of said torque-transmitting mechanisms;

said third member of said first planetary gearset being continuously interconnected with said input shaft and with said first member of said second planetary gearset;

said second member of said second planetary gearset being selectively connectible with said second member of said first planetary gearset through said first torque-transmitting mechanism and selectively connectible with said input shaft through a second of said torque-transmitting mechanisms and continuously connected with said first member of said fourth planetary gearset;

said third member of said second planetary gearset being selectively connectible with said housing through a third of said torque-transmitting mechanisms;

said first member of said third planetary gearset being continuously connected with said second member of said fourth planetary gearset and selectively connectible with said transmission housing through a fourth of said torque-transmitting mechanisms;

said second member of said third planetary gearset being continuously connected with said output shaft;

said third member of said third planetary gearset being continuously connected with said third member of said fourth planetary gearset and selectively connectible with said input shaft through a fifth of said torque-transmitting mechanisms, and selectively connectible with said transmission housing through a sixth of said torque-transmitting mechanisms;

said second member of said second planetary gearset and said first member of said fourth planetary gearset being selectively connectible with said transmission housing through a seventh of said torque-transmitting mechanisms; and said torque-transmitting mechanisms being selectively connectible in combinations of two to establish a reverse speed ratio and eight forward speed ratios between said input shaft and said output shaft.

2. The powertrain having a multi-speed power transmission defined in claim 1, further wherein:

said torque-transmitting mechanisms are also operable to establish two additional reverse speed ratios through said planetary gearset between said input shaft and said output shaft.

3. The powertrain having a multi-speed power transmission defined in claim 2, further wherein:

said reverse speed ratios range from lowest to highest and a single transition interchange is provided between the lowest of said reverse speed ratios and the lowest of said first forward speed ratio, a single transition shift is provided between the intermediate of said reverse speed ratios and the next lowest forward speed ratio, and a single transition shift is provided between the highest of said reverse speed ratios and the third lowest of said forward speed ratios.

4. The powertrain having a multi-speed power transmission defined in claim 3, further wherein:

the sixth of said torque-transmitting mechanisms is engaged for all three of said reverse speed ratios and is disengaged for all of said forward speed ratios.

5. The powertrain having a multi-speed power transmission defined in claim 1, further wherein:

said fourth torque-transmitting mechanism is engaged for the four lowest forward speed ratios, and the fifth torque-transmitting mechanism is engaged for the five highest of said forward speed ratios.

* * * * *